United States Patent
Hepworth et al.

(10) Patent No.: US 8,001,550 B2
(45) Date of Patent: Aug. 16, 2011

(54) OBJECT IDENTIFIER READERS THAT ARE CONFIGURED TO AUTOMATICALLY SEND AND/OR STORE DATA READ FROM AN OBJECT IDENTIFIER

(75) Inventors: Paul Hepworth, Riverton, UT (US); George Powell, Sandy, UT (US)

(73) Assignee: The Code Corporation, Bluffdale, UT (US)

(*) Notice: Subject to any disclaimer, the term of this patent is extended or adjusted under 35 U.S.C. 154(b) by 1484 days.

(21) Appl. No.: 10/806,303

(22) Filed: Mar. 22, 2004

(65) Prior Publication Data

US 2005/0210475 A1    Sep. 22, 2005

(51) Int. Cl.
  *G06F 3/00*       (2006.01)
  *G06F 17/60*     (2006.01)
(52) U.S. Cl. .......................................... 719/310; 705/26
(58) Field of Classification Search .................... 719/310
   See application file for complete search history.

(56) References Cited

U.S. PATENT DOCUMENTS

| | | | |
|---|---|---|---|
| 4,488,679 A | 12/1984 | Bockholt et al. |
| 5,465,291 A | 11/1995 | Barrus et al. |
| 5,483,052 A | 1/1996 | Smith, III et al. |
| 5,804,803 A | 9/1998 | Cragun et al. |
| 5,869,819 A | 2/1999 | Knowles et al. |
| 5,903,729 A | 5/1999 | Reber et al. |
| 5,905,248 A | 5/1999 | Russell et al. |
| 5,905,251 A | 5/1999 | Knowles |
| 5,933,829 A | 8/1999 | Durst et al. |
| 5,946,698 A * | 8/1999 | Lomet ........................... 707/202 |
| 5,978,773 A | 11/1999 | Hudetz et al. |
| 5,992,752 A | 11/1999 | Wilz, Sr. et al. |
| 6,012,102 A | 1/2000 | Shachar |
| 6,027,024 A | 2/2000 | Knowles |
| 6,032,195 A | 2/2000 | Reber et al. |
| 6,068,188 A | 5/2000 | Knowles |
| 6,076,733 A | 6/2000 | Wilz, Sr. et al. |
| 6,108,656 A | 8/2000 | Durst et al. |
| 6,138,151 A | 10/2000 | Reber et al. |

(Continued)

FOREIGN PATENT DOCUMENTS

WO    WO 98/03923    1/1998

(Continued)

*Primary Examiner* — Li B Zhen
*Assistant Examiner* — Abdou K Seye
(74) *Attorney, Agent, or Firm* — Austin Rapp & Hardman

(57) ABSTRACT

Object identifier readers that are configured to automatically send and/or store data read from an object identifier are disclosed. An exemplary object identifier reader includes a communication port for communicating with a host computing device. The object identifier reader also includes a storage medium. The object identifier reader also includes a processor and memory in electronic communication with the processor. Instructions are stored in the memory. The instructions are executable to implement a method that involves reading an object identifier to obtain data. The data may be stored in the storage medium. Alternatively, or in addition, an attempt may be made to send the data to the host computing device. The method also involves attempting to send stored data in the storage medium to the computing device if the object identifier reader is connected to the host computing device.

9 Claims, 12 Drawing Sheets

U.S. PATENT DOCUMENTS

| | | |
|---|---|---|
| 6,154,738 A | 11/2000 | Call |
| 6,178,427 B1 * | 1/2001 | Parker ........................... 707/202 |
| 6,289,355 B1 * | 9/2001 | Haderle et al. ................ 707/200 |
| 6,377,986 B1 | 4/2002 | Philyaw et al. |
| 6,384,744 B1 | 5/2002 | Philyaw et al. |
| 6,565,005 B1 * | 5/2003 | Wilz et al. ................ 235/462.25 |
| 2002/0143643 A1 * | 10/2002 | Catan ............................ 705/26 |
| 2003/0222150 A1 * | 12/2003 | Sato et al. ................ 235/472.02 |
| 2004/0016812 A1 * | 1/2004 | Schmidt et al. .......... 235/462.31 |
| 2004/0113791 A1 * | 6/2004 | Salim et al. ................ 340/572.3 |
| 2005/0021751 A1 * | 1/2005 | Block et al. .................... 709/225 |
| 2005/0103854 A1 * | 5/2005 | Zhu et al. ................. 235/462.22 |
| 2007/0293258 A1 * | 12/2007 | Gollnick et al. .............. 455/517 |

FOREIGN PATENT DOCUMENTS

| | | |
|---|---|---|
| WO | WO 98/06055 | 2/1998 |
| WO | WO 98/24036 | 6/1998 |
| WO | WO 98/40823 | 9/1998 |
| WO | WO 98/49813 | 11/1998 |
| WO | WO 99/04326 | 1/1999 |

* cited by examiner

OBJECT IDENTIFIER READERS THAT ARE CONFIGURED TO AUTOMATICALLY SEND AND/OR STORE DATA READ FROM AN OBJECT IDENTIFIER

TECHNICAL FIELD

The present invention relates generally to object identifier readers. More specifically, the present invention relates to object identifier readers that are configured to automatically send and/or store data read from an object identifier.

BACKGROUND

Computer technology has entered many areas to simplify manual tasks and to make information more readily available. Many people use several computer-related products every day that greatly simplify their work day. In addition, through the use of a computer, vast amounts of information are readily available. Computer software and electronic information sources are typically found on storage media or storage devices such as hard drives, CD-ROMs, DVD-ROMs, etc., on a local computer, on a local computer network or a global computer network, such as the Internet.

Computer programs can be used for many purposes including assisting a person in performing his or her job. For example, word processors help computer users prepare documents, spreadsheet programs help users perform accounting functions and numerical analysis, diagnostic programs assist users in diagnosing problems, etc. There are many programs available to help users with almost any need they may have. Computer programs often need some type of manual input to help a user, from simply starting the program to entering a significant amount of input.

Before a user can access relevant electronic information, he or she usually enters some input before helpful information becomes available. By way of example, many computer users, when looking for particular information, will use the World Wide Web (the "Web") to find information. Typically users will begin their search for information by using a search engine on the Web. To perform a search, a user first enters one or more search terms. Typically, a user will then browse the results by clicking on various links and reading through the information found. After some manual browsing, the user often finds the relevant information. Finding and accessing electronic information from a CD-ROM or from a hard drive is similar in that some manual searching and browsing of data is generally required.

A machine-readable object identifier (hereinafter, "object ID") is a machine-readable data storage medium that is used to uniquely identify something, such as a product or a representation of a product (e.g., a picture of a product in a catalog). Examples of object IDs include machine-readable graphical codes ("graphical codes"), radio frequency identification tags ("RFID tags"), magnetic stripes, and so forth. Object IDs may be placed on objects, printed on labels that can be affixed to objects, inserted into printable documents that contain representations of objects, and so forth. An object ID reader is a device that "reads," or obtains data from, an object ID.

As mentioned, one type of object ID is a graphical code. A graphical code is a graphical representation of information that consists of multiple graphical code elements having different light reflective or light emissive properties. Examples of different types of graphical codes include bar codes, data matrix codes, MaxiCodes, optical character recognition ("OCR") text, and so forth. Graphical codes have become widely used in many commercial environments, such as point-of-sale stations in retail stores and supermarkets, inventory and document tracking, and the like.

Some known object ID readers may be used in a "live" mode where data are sent immediately to a host computing device. Alternatively, they may be used in a "batch" mode where data are stored and later uploaded to a host. Benefits may be realized by improved object identifier readers that are configured to automatically send and/or store data read from an object identifier.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
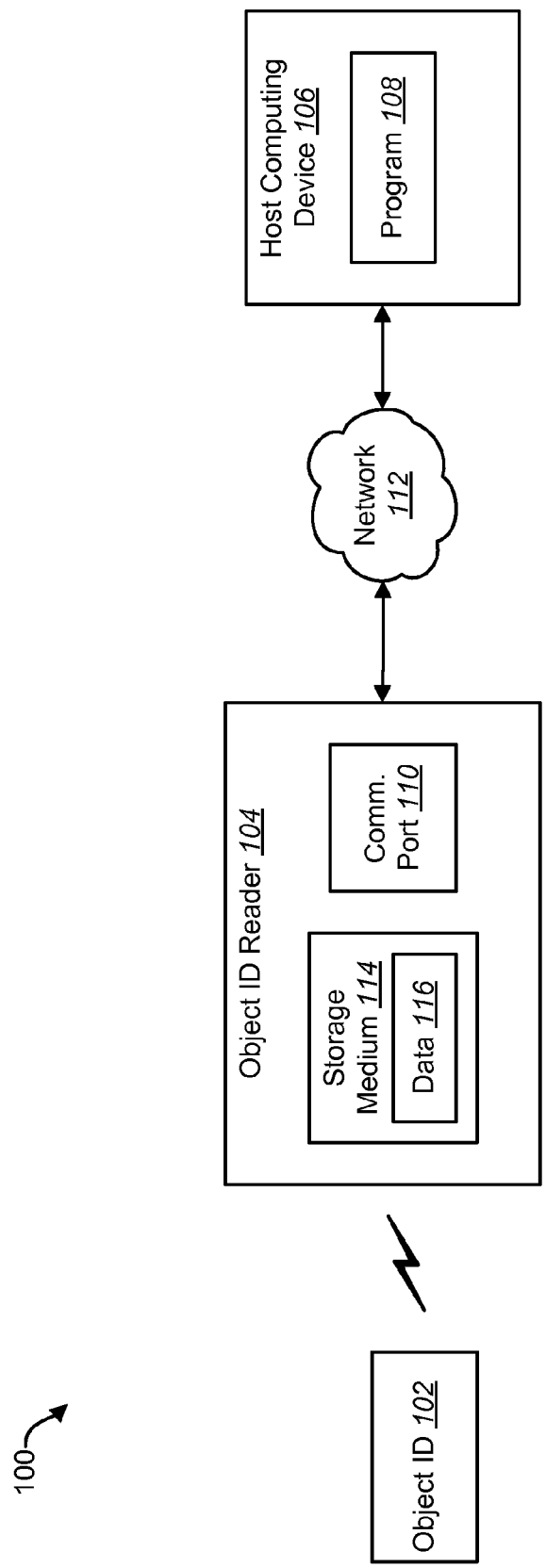
FIG. 1 illustrates an exemplary system in which some embodiments may be practiced.

An object identifier reader is disclosed. The object identifier reader includes a communication port for communicating with a host computing device. The object identifier reader also includes a storage medium. The object identifier reader also includes a processor and memory in electronic communication with the processor. Instructions are stored in the memory. The instructions are executable to implement a method that involves reading an object identifier to obtain data. The method also involves at least one of storing the data in the storage medium and attempting to send the data to the host computing device. The method may involve attempting to connect to the host computing device if the object identifier reader is not connected to the host computing device. If the object identifier reader is connected to the host computing device, the method also involves attempting to send stored data in the storage medium to the host computing device. In some embodiments, the method also involves clearing the stored data from the storage medium when the stored data are sent to the computing device.

In some embodiments, the data are stored in the storage medium and at least one attempt is made to send the data to the host computing device. Alternatively, at least one attempt is made to send the data to the host computing device if the storage medium is empty, and the data are stored in the storage medium if the at least one attempt fails or if the storage medium is not empty. Alternatively still, at least one attempt is made to send the data to the host computing device, and the data are stored in the storage medium if the at least one attempt fails.

In some embodiments, reading the object identifier is performed by a main task, and the other steps of the method are performed by a data task that executes in parallel to the main task. If the data comprise an image, the main task and the data task may execute sequentially.

The storage medium of the object identifier reader may include non-volatile storage. In some embodiments, the storage medium may additionally include volatile storage.

In some embodiments, the object identifier reader may include an additional storage medium for storing a copy of the data as a log. Alternatively, the method may involve saving metadata in the storage medium to differentiate buffered data from log data.

In some embodiments, the method involves disconnecting from the host computing device if the object identifier reader is connected to the computing device and the object identifier reader does not have any data to send to the host computing device. A power-saving mode may be entered if the storage medium is empty or if the object identifier reader cannot connect to the host computing device after a period of time.

Another embodiment of an object identifier reader is also disclosed. The object identifier reader includes a communication port for communicating with a host computing device. The object identifier reader also includes a storage medium. The object identifier reader also includes a processor and memory in electronic communication with the processor. Instructions are stored in the memory. The instructions are executable to implement a method that involves reading an object identifier to obtain data. The method also involves storing the data in the storage medium. The method also involves attempting to connect to the host computing device if the object identifier reader is not connected to the host computing device. If the object identifier reader is connected to the host computing device, the method also involves attempting to send stored data in the storage medium to the host computing device.

Another embodiment of an object identifier reader is also disclosed. The object identifier reader includes a communication port for communicating with a host computing device. The object identifier reader also includes a storage medium. The object identifier reader also includes a processor and memory in electronic communication with the processor. Instructions are stored in the memory. The instructions are executable to implement a method that involves reading an object identifier to obtain data. The method also involves attempting to connect to the host computing device if the object identifier reader is not connected to the host computing device. If the storage medium is empty, the method also involves making at least one attempt to send the data to the host computing device. If the at least one attempt fails or if the storage medium is not empty, the data is stored in the storage medium. If the object identifier reader is connected to the host computing device, the method involves attempting to send stored data in the storage medium to the computing device.

Another embodiment of an object identifier reader is also disclosed. The object identifier reader includes a communication port for communicating with a host computing device. The object identifier reader also includes a storage medium. The object identifier reader also includes a processor and memory in electronic communication with the processor. Instructions are stored in the memory. The instructions are executable to implement a method that involves reading an object identifier to obtain data. The method also involves attempting to connect to the host computing device if the object identifier reader is not connected to the host computing device. The method also involves making at least one attempt to send the data to the host computing device. The method also involves storing the data in the storage medium if the at least one attempt fails. If the object identifier reader is connected to the host computing device, the method also involves attempting to send stored data in the storage medium to the computing device.

A method in an object identifier reader is also disclosed. The method involves reading an object identifier to obtain data. The method also involves at least one of storing the data in a storage medium of the object identifier reader and attempting to send the data to a host computing device. If the object identifier reader is connected to the host computing device, the method also involves attempting to send stored data in the storage medium to the host computing device.

Another embodiment of a method in an object identifier reader is also disclosed. The method involves reading an object identifier to obtain data. The method also involves storing the data in a storage medium of the object identifier reader. The method also involves attempting to connect to a host computing device if the object identifier reader is not connected to the host computing device. If the object identifier reader is connected to the host computing device, the method also involves attempting to send stored data in the storage medium to the host computing device.

Another embodiment of a method in an object identifier reader is also disclosed. The method involves reading an object identifier to obtain data. The method also involves attempting to connect to a host computing device if the object identifier reader is not connected to the host computing device. If a storage medium of the object identifier reader is empty, the method also involves making at least one attempt to send the data to the host computing device. If the at least one attempt fails or if the storage medium is not empty, the method also involves storing the data in the storage medium. If the object identifier reader is connected to the host computing device, the method also involves attempting to send stored data in the storage medium to the computing device.

Another embodiment of a method in an object identifier reader is also disclosed. The method involves reading an object identifier to obtain data. The method also involves attempting to connect to a host computing device if the object identifier reader is not connected to the host computing device. The method also involves making at least one attempt to send the data to the host computing device. The method also involves storing the data in a storage medium of the object identifier reader if the at least one attempt fails. If the object identifier reader is connected to the host computing device, the method also involves attempting to send stored data in the storage medium to the computing device.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion; however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 illustrates an exemplary system 100 in which some embodiments may be practiced. The system 100 includes one or more machine-readable object identifiers 102 (hereinafter, "object IDs 102"). An object ID 102 is a machine-readable data storage medium that is used to uniquely identify something, such as a product, a representation of a product (e.g., a picture of a product in a catalog) or information that relates to the product. Examples of objects IDs 102 include machine-readable graphical codes ("graphical codes"), radio frequency identification tags ("RFID tags"), magnetic stripes, and so forth. Object IDs 102 may be placed on objects, printed on labels that can be affixed to objects, inserted into printable documents that contain representations of objects, and so forth. An object ID reader 104 is a device that "reads," or obtains data from, an object ID 102.

The system 100 also includes one or more host computing devices 106. A computing device 106 is any device that includes a digital processor capable of receiving and processing data. Examples of computing devices 106 include personal computers, hand-held computers, microcontrollers, servers, mainframes, supercomputers, and so forth. A host computing device 106 may sometimes be referred to herein as simply a host 106. At least one software program 108 is executing on the host 106.

The object ID reader 104 also includes one or more communication ports 110. The communication port(s) 110 may be wired or wireless. The object ID reader 104 is capable of electronic communication with the computing device(s) 106 in the system 100 via the communication port(s) 110. In some embodiments, both the object ID reader 104 and the computing device(s) 106 are part of a computer network 112, and data sent from the object ID reader 104 may pass through one or more intervening nodes on the network 112 en route to the computing device(s) 106. Many different types of networks 112 are known to those skilled in the art. The embodiments disclosed herein are not limited to any specific type of network 112.

The object ID reader 104 also includes a storage medium 114. In typical embodiments, the storage medium 114 includes nonvolatile storage, such as a flash memory. However, in some embodiments the storage medium 114 may also include volatile storage, as will be explained in greater detail below. Data 116 that are obtained from reading object IDs 102 may be stored in the storage medium 114.

In embodiments disclosed herein, the object ID reader 104 is configured to automatically determine whether to send or store data 116 that are obtained by reading object IDs 102. The object ID reader 104 may also be configured to automatically send data 116 that are stored in the storage medium 114 to the host 106. An object ID reader 104 that is configured in this manner may be useful in a wireless environment where the user may move in and out of connection range of the host 106. When the object ID reader 104 is connected to the host 106, data 116 may be sent to the host 106. When the object ID reader 104 is out of range, data 116 may be stored in the storage medium 114 and then automatically uploaded to the host 106 when a connection can be established again. Additional details about various embodiments of the object ID reader 104 will be provided below.

Figure 2:
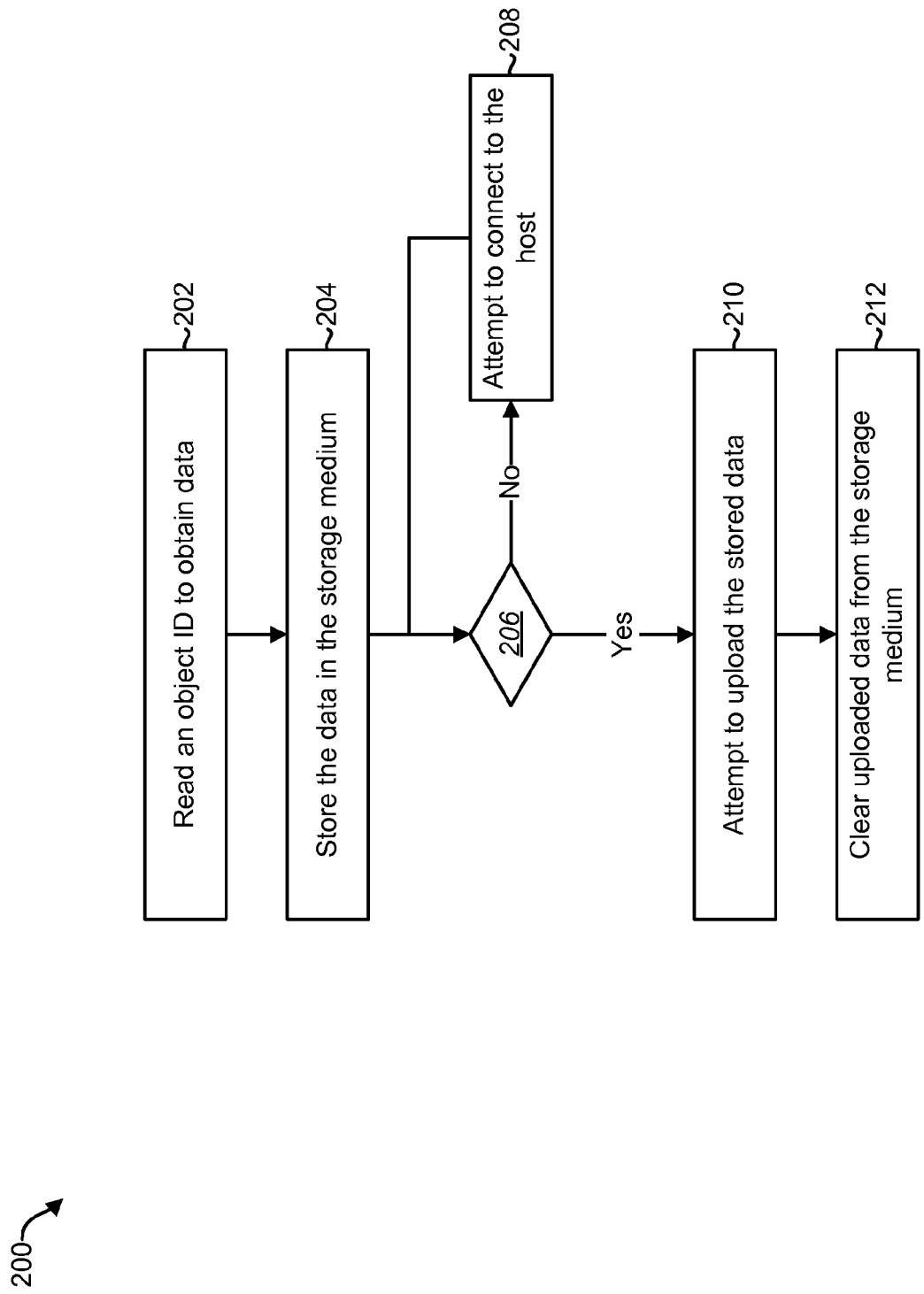
FIG. 2 is a flow diagram illustrating an embodiment of a method that may be performed by the object ID reader of FIG. 1.

FIG. 2 is a flow diagram illustrating an embodiment of a method 200 that may be performed by the object ID reader 104 of FIG. 1. The method 200 involves obtaining 202 data 116 by reading an object ID 102. In some embodiments, the data 116 that are obtained may be decoded data. In such embodiments, the step of obtaining data 116 by reading an object ID 102 may involve reading an object ID 102 and then decoding the resulting object ID data. Alternatively, the data 116 that are obtained may include an image. This may be the case, for example, where the object ID 102 is a graphical code and the object ID reader 104 is a graphical code reader. In such embodiments, the step of obtaining data 116 by reading an object ID 102 may involve capturing an image of a graphical code.

Once the data 116 are obtained 202, they are stored 204 in the storage medium 114. In some embodiments, the storage medium 114 takes the form of a circular buffer. In such embodiments, the step of storing 204 the data 116 in the storage medium 114 may involve appending the data 116 to the end of the circular buffer.

The reader 104 then determines 206 whether it is connected to the host 106. If the reader 104 is not connected to the host 106, it attempts 208 to connect to the host 106. If the object ID reader 104 is connected to the host 106, an attempt is made to upload 210 the stored data 116 to the host 106. As the data 116 are successfully uploaded, they are cleared 212 from the storage medium 114.

When the object ID reader 104 is idle, it may attempt to upload whatever data 116 are stored in the storage medium 114 to the host 106. In other words, the reader 104 may be configured so that whenever it is idle and the storage medium 114 is not empty, it attempts to connect to the host 106 (if the reader 104 is not already connected) and attempts to upload the stored data 116 in the storage medium 114 to the host 106. Alternatively, in some embodiments the reader 104 may be configured so that it does not attempt to upload the stored data 116 when it is idle.

There are various alternatives to the method 200 illustrated in FIG. 2. For example, the object ID reader 104 may be configured so that if it is not connected, it does not automatically attempt to connect to the host 106. Another possible alternative is that a copy of the data 116 may be stored (this may be referred to herein as a log), but the data 116 are not automatically uploaded to the host 106. Alternatively still, the object ID reader 104 may be configured so that it always attempts to send the data 116 to the host 106 and also stores a copy (log). Alternatively still, the object ID reader 104 may be configured so that the data 116 are not stored. If data 116 would have been stored, the user may be alerted and the data 116 may be discarded. Also, in some alternative embodiments, the data 116 are not erased after they are uploaded, although the data 116 may be marked as uploaded. These and various other alternatives will be discussed in greater detail below.

Figure 3:
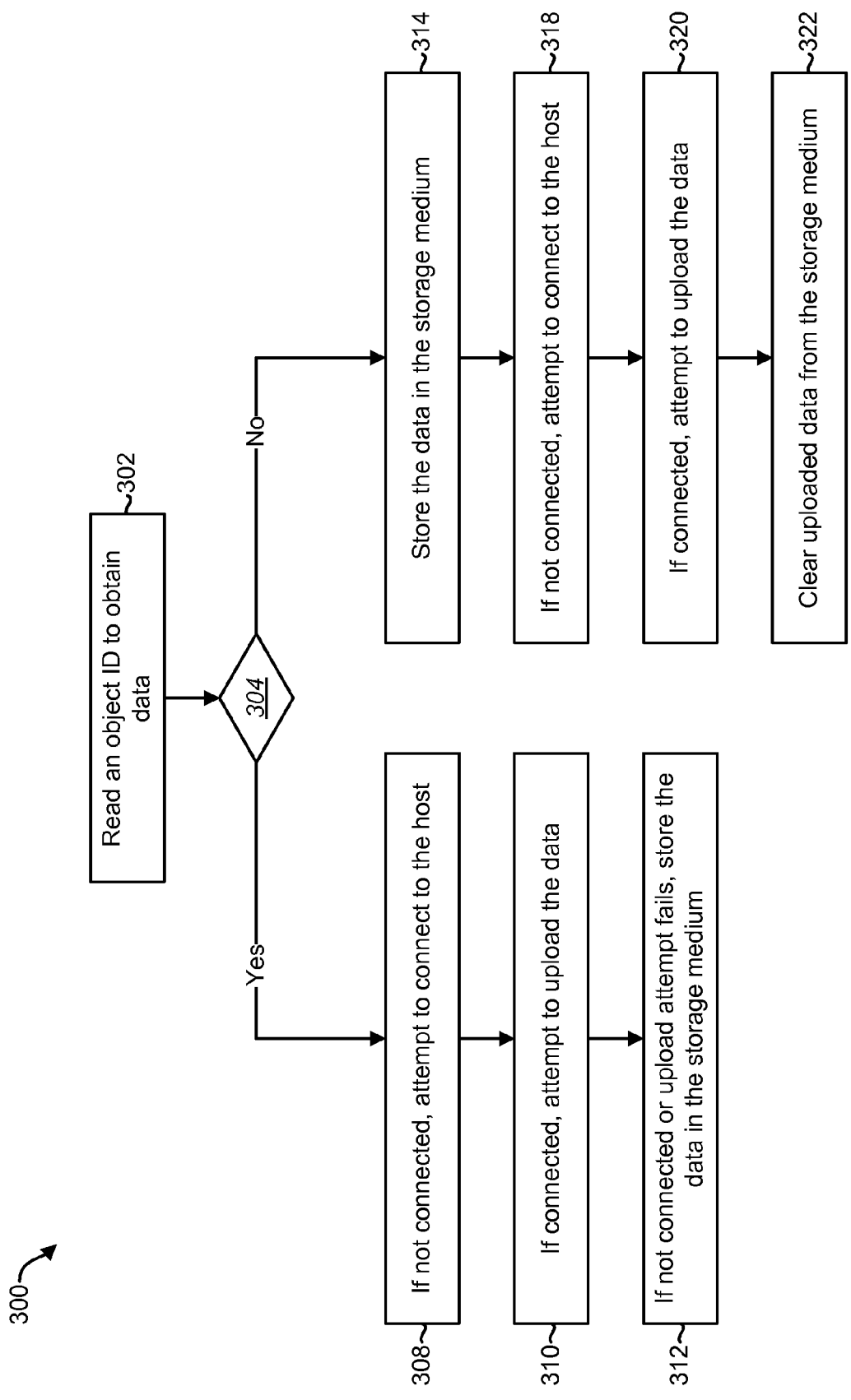
FIG. 3 is a flow diagram illustrating another embodiment of a method that may be performed by the object ID reader of FIG. 1.

FIG. 3 is a flow diagram illustrating another embodiment of a method 300 that may be performed by the object ID reader 104 of FIG. 1. As before, the method 300 involves reading 302 an object ID 102 to obtain data 116.

If it is determined 304 that the storage medium 114 is empty, the reader 104 determines whether it is connected to the host 106. If the reader 104 is not connected to the host 106, it attempts 308 to connect to the host 106.

If the reader 104 is connected to the host 106, it attempts to upload 310 the data 116 obtained in step 302 to the host 106. If the reader 104 is not connected or the upload attempt fails, the data 116 are stored 312 in the storage medium 114.

If in step 304 it is determined that the storage medium 114 is not empty, the reader 104 stores 314 the data 116 in the storage medium 114. The reader 104 then determines whether it is connected to the host 106. If the reader 104 is not connected to the host 106, it attempts 318 to connect to the host 106.

If the reader 104 is connected to the host 106, it attempts to upload 320 the data that are stored in the storage medium 114. As the stored data 116 are uploaded to the host 106, they are cleared 322 from the storage medium 114.

As before, when the object ID reader 104 is idle, it may attempt to upload whatever data 116 are stored in the storage medium 114 to the host 106. In other words, the reader 104 may be configured so that whenever it is idle and the storage medium 114 is not empty, it attempts to connect to the host 106 (if the reader 104 is not already connected) and attempts to upload the stored data 116 in the storage medium 114 to the host 106. Alternatively, the reader 104 may be configured so that it does not attempt to upload the stored data 116 when it is idle.

The reader 104 may also be configured with a power-saving mode enhancement. When the object ID reader 104 is idle, if the storage medium 114 is empty or the reader 104 cannot connect to the host 106 after a reasonable period of trying, the reader 104 may be configured to go into power-saving mode.

Figure 4:
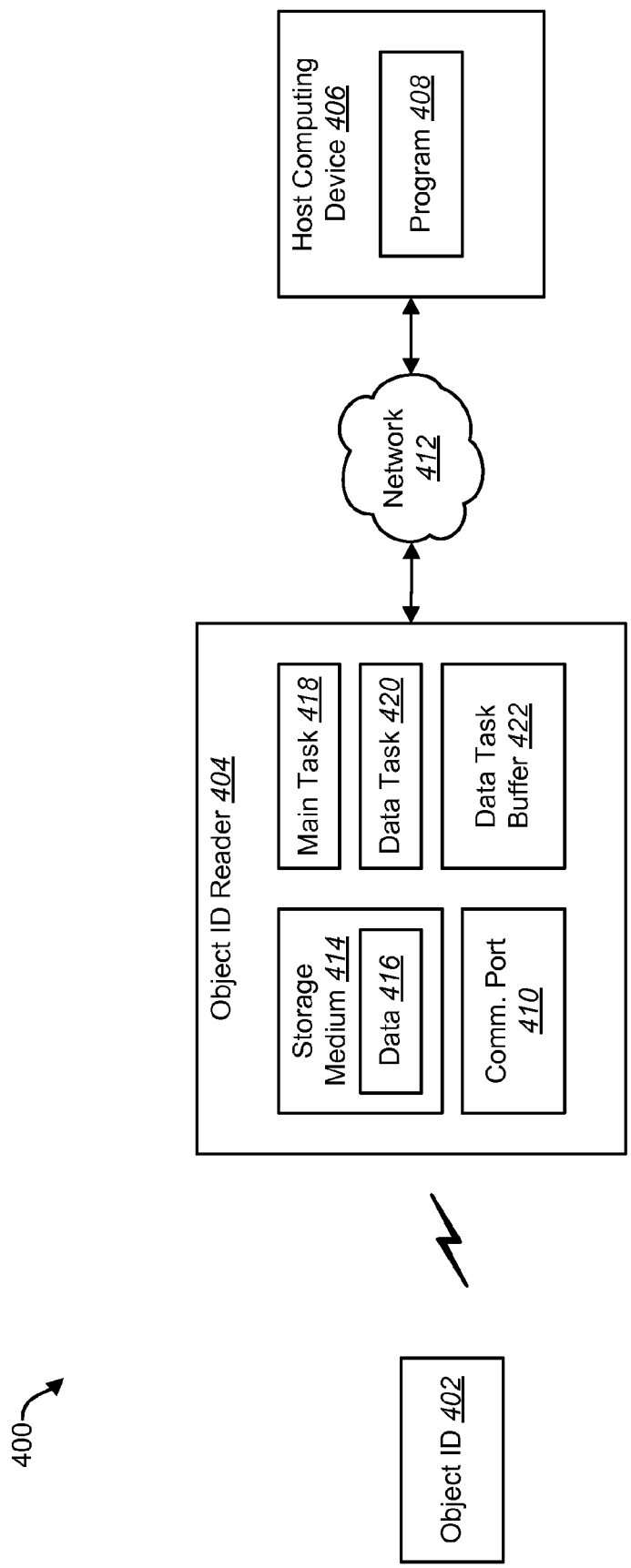
FIG. 4 is a block diagram illustrating another exemplary system in which some embodiments may be practiced.

FIG. 4 is a block diagram illustrating another exemplary system 400 in which some embodiments may be practiced. As before, the system 400 includes an object ID reader 404 that is configured to read an object ID 402. The object ID reader 404 includes a storage medium 414 for storing data 416 that are obtained by reading the object ID 402. The object ID reader 404 also includes one or more communication ports 410 for placing the reader 404 in electronic communication with one or more host computing devices 406, possibly via one or more computer networks 412. One or more software programs 408 are running on the host computing device 406.

In the illustrated embodiment, the object ID reader 404 is configured to read object IDs 402 concurrently with the sending/storing of data 416. Two tasks are performed in parallel, a main task 418 and a data task 420. These tasks 418, 420 will be described in greater detail below. The object ID reader 404 also includes a data task buffer 422. The main task 418 may use the data task buffer 422 to send data 416 to the data task 420, as will be described in greater detail below. In some embodiments, the data task buffer 422 includes volatile storage. The data task buffer 422 may be configured as a circular buffer.

Figure 5:
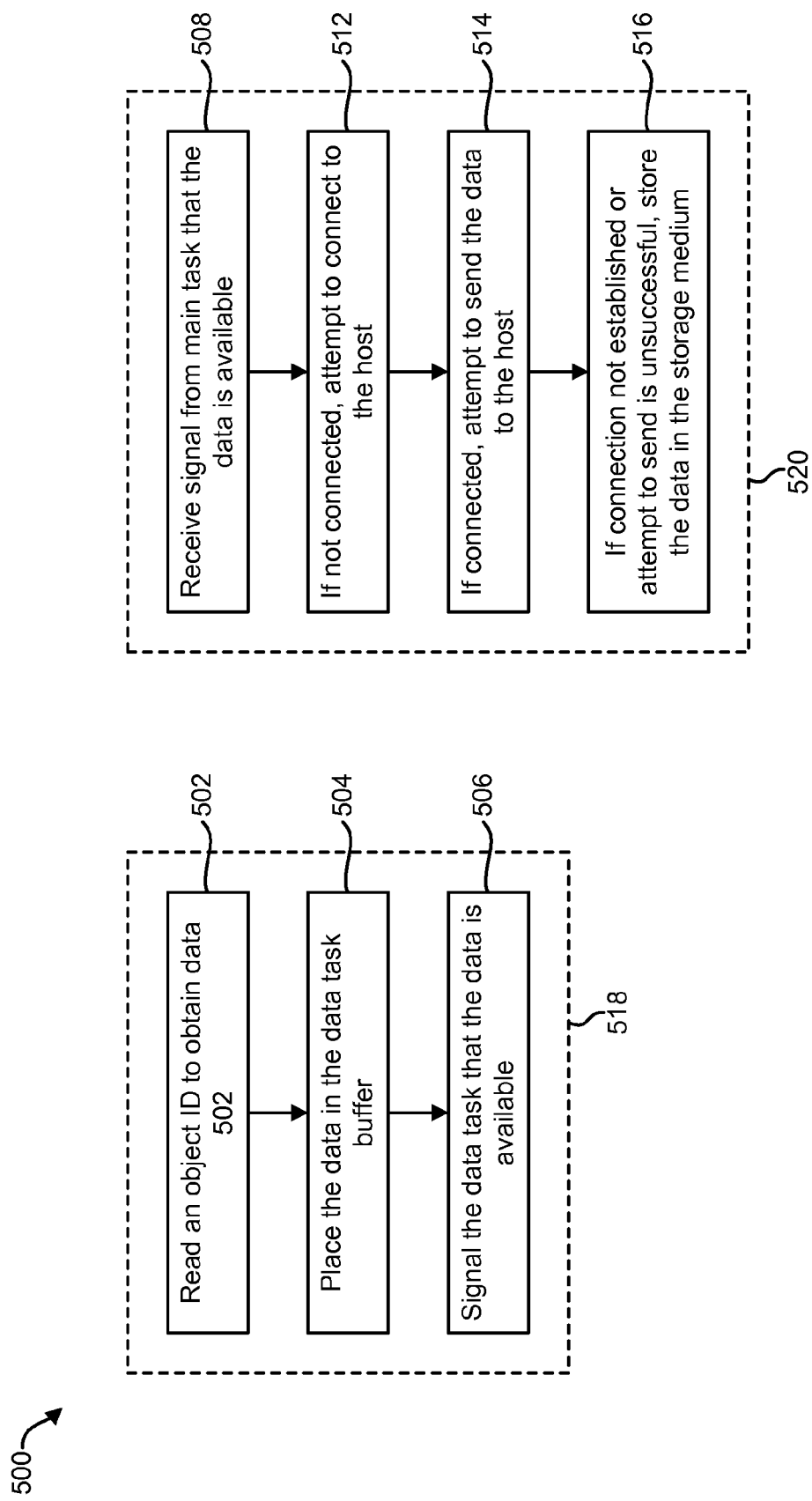
FIG. 5 is a flow diagram illustrating an embodiment of a method that may be performed by the object ID reader of FIG. 4.

FIG. 5 is a flow diagram illustrating an embodiment of a method 500 that may be performed by the object ID reader 404 of FIG. 4. As indicated previously, in the illustrated embodiment, two tasks 518, 520 are performed in parallel, a main task 518 and a data task 520. The main task 518 involves reading 502 an object ID 402 to obtain data 416. The data 416 are placed 504 in the data task buffer 422, and the data task 520 is signaled 506 that the data 416 are available. If there is insufficient space in the data task buffer 422, the main task 518 waits until the data task buffer 422 has sufficient space (i.e., waits for the data task 420 to process some of the data 416 from the data task buffer 422).

The data task 520 performs the function of sending and/or storing the data 416. The data task 520 receives 508 a signal from the main task 518 that the data 416 are available. If the reader 404 is not connected to the host 406, the data task 520 attempts 512 to connect the reader 404 to the host 406. If the reader 404 is connected to the host 406, the data task 520 attempts to send 514 the data 416 in the data task buffer 422 to the host 406. If the reader 404 is not connected or the attempt to send the data 416 to the host 406 is unsuccessful, the data task 520 stores 516 the data 416 in the storage medium 414.

In the illustrated embodiment, the main task 518 and the data task 520 are executed in parallel. In other words, the main task 518 does not wait while the data task 520 executes.

When the object ID reader 404 is idle, the object ID reader 404 may be configured to upload any stored data 416 from the storage medium 414 to the host 406. For each object ID data set (i.e., the data 416 that were obtained from a single object ID 402) in the storage medium 414, the main task 518 places the object ID data set in the data task buffer 422 and signals the data task 520 that there are data 416 available. If the main task 518 is able to send the object ID data set to the data task 520, the data task 520 performs the steps described above. If the main task 518 is unable to send the object ID data set to the data task 520 (because, for example, the data task buffer 422 is full), the upload attempt is aborted. In some embodiments, an object ID data set is handled atomically, i.e., send or store either succeeds or fails on the data 416 from one object ID 402 as a unit. In such embodiments, there are no partial stores or erases, and with a packet-based communication protocol, all partial sends are discarded by the host 406.

In the embodiments described in connection with FIGS. 1-3, images (e.g., jpeg files, bmp files, etc.) may be handled in the same manner as decoded data. For the embodiment described in connection with FIGS. 4-5, this may not be true unless the data task buffer 422 can be sufficiently large to hold the largest image. In a memory constrained system, this may not be feasible. The following describes an exemplary approach for adding image send/store capability to the embodiment of FIGS. 4-5 when the data task buffer 422 is smaller than an image. As indicated previously, for normal decoded data, the main task 518 and the data task 520 may be performed in parallel. However, for an image, it may be advantageous if the main task 518 is configured to wait while the data task 520 processes the image.

Figure 6:
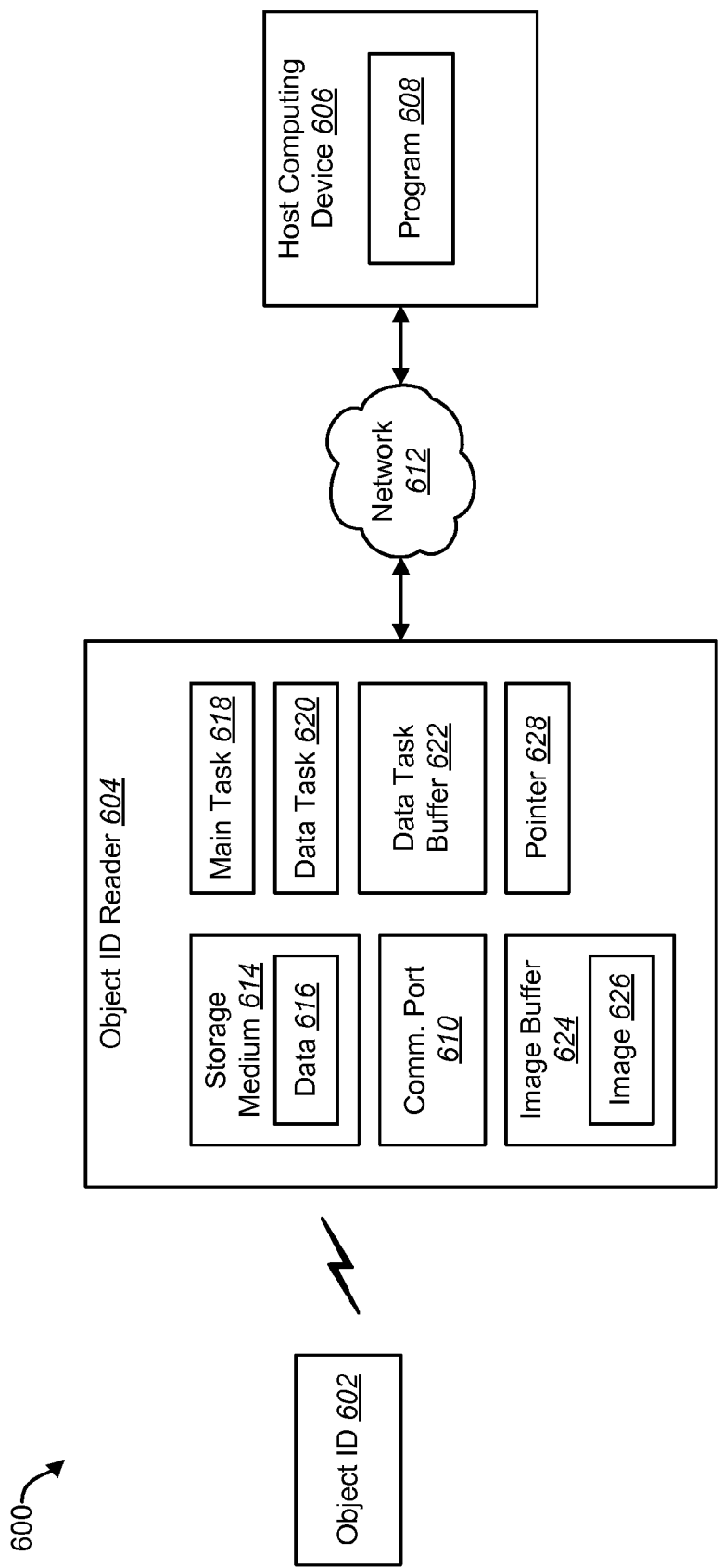
FIG. 6 illustrates an exemplary system which includes an object ID reader that is configured with image send/store capability.

FIG. 6 illustrates an exemplary system 600 which includes an object ID reader 604 that is configured with the image send/store capability. As before, the system 600 includes one or more object IDs 602 that are read by the object ID reader 604. The object ID reader 604 includes a storage medium 614 for storing data 616 that is obtained by reading the object ID 602. As indicated previously, the data 616 may include captured images of the object IDs 602. Alternatively, or in addition, the data 616 may include decoded data obtained by decoding the captured images.

The object ID reader 604 also includes an image buffer 624. Under some circumstances (as will also be explained in greater detail below), captured images 626 may be stored, at least temporarily, in the image buffer 624. Additional details about a graphical code reader that includes at least one image buffer for image capture and decoding are provided in U.S. patent application Ser. No. 10/776,449, now U.S. Pat. No. 7,519,239, entitled "Systems and Methods for Concurrent Image Capture and Decoding of Graphical Codes," filed Feb. 11, 2004, assigned to The Code Corporation and hereby incorporated by reference in its entirety.

The object ID reader 604 also stores a pointer 628 to the image buffer 624. The pointer 628 may be null in its initial condition.

As before, the object ID reader 604 is configured so that two tasks may be performed, a main task 618 and a data task 620. The object ID reader 604 may also include a data task buffer 622, as discussed above.

Also as before, the object ID reader 604 also includes one or more communication ports 610 for placing the reader 604 in electronic communication with one or more host computing devices 606, possibly via one or more computer networks 612. One or more software programs 608 are running on the host computing device 606.

Figure 7:
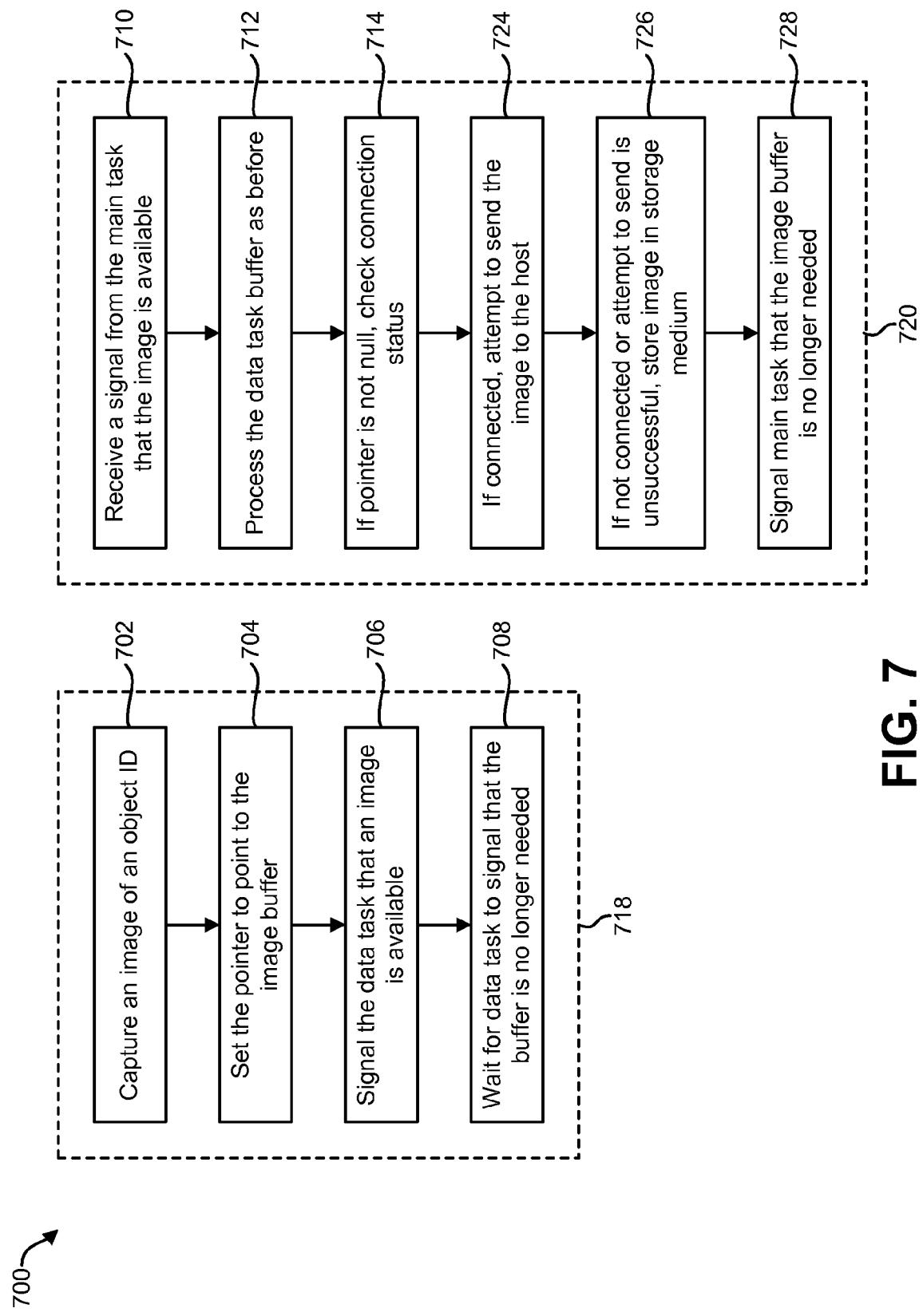
FIG. 7 is a flow diagram illustrating an embodiment of a method that may be performed by the object ID reader of FIG. 6.

An exemplary method 700 that may be performed by the object ID reader 604 of FIG. 6 is illustrated in FIG. 7. When the main task 718 captures 702 an image 626 of an object ID 602, the image 626 is stored in the image buffer 624 and the pointer 628 is set 704 to point to the image buffer 624. The main task 718 signals 706 the data task 720 that an image 626 is available. The main task 718 then waits 708 for the data task 720 to signal that the image buffer 624 is no longer needed.

The data task 720 receives 710 a signal from the main task 718 that the image 626 is available. The data task 720 processes 712 the data task buffer 622 as discussed previously in connection with FIGS. 4-5. Therefore, data 616 that does not comprise an image 626 is processed as described previously. If the pointer 628 is not null, the connection status of the object ID reader 604 is checked 714. If the object ID reader 604 is connected to the host 606, an attempt is made to send 724 the image 626 to the host 606. If the reader 604 is not connected to the host 606 or the attempt to send the image 626 to the host 606 is unsuccessful, the image 626 is stored 726 in the storage medium 614. The main task 718 is then signaled 728 that the image buffer 624 is no longer needed, and the pointer 628 is set to null.

As before, when the reader 604 is idle, data 616 that are stored in the storage medium 614 may be uploaded to the host 606. In some embodiments, for each object ID data set (i.e., the data 616 that were obtained from a single object ID 602, as discussed above) in the storage medium 614, the following steps are performed. If the object ID data set includes only decoded data, the main task 718 attempts to copy the object ID data set to the data task buffer 622 and signal the data task 720. If this fails, the attempted upload is aborted. Otherwise (i.e., if the object ID data set comprises an image 626), the main task 718 copies the object ID data set from the storage medium 614 to the image buffer 624. The pointer 628 is set to point to the image buffer 624, and the data task 720 is signaled. The main task 718 then waits for the data task 720 to signal that the image buffer 624 is no longer needed.

An alternative is for the main task 718 to fragment the image 626 into pieces that are not too large for the data task buffer 622 and then process the fragments the same as with decoded data (waiting for the data task 720 to process fragments when the data task buffer 622 is too full for the next fragment). Since send/store would be per fragment, it would be possible for part of the image 626 to be sent then part of it stored, which may be undesirable. For example, if the host program 608 is terminated between receiving the first part and the remainder being uploaded from storage 614, it might not be possible to resend the complete image 626.

The data task 720 would typically fragment the image 626 into smaller packets (and support error detection and retransmission) according to an established low-level protocol between the reader 604 and the host 606 (for example, the well-known Kermit, Xmodem, or TCP/IP protocols). However, at the higher level, the image 626 would be processed atomically, i.e., it would either succeed or fail as a complete image 626. If part of the image 626 is successfully sent but not the entire image 626, the entire image 626 would be stored, and the host 606 would discard the partially received image 626. Later, the entire image 626 would be uploaded from storage 614. Of course, similar fragmentation and atomic processing techniques may be applied to decoded data 616 as well as images 626. Such techniques may be applied in all embodiments described herein.

In the embodiments described above in connection with FIGS. 4-7, data 416 may be copied between the main task 418 and the data task 420. This copying is generally much faster than the time to send the data 416 to the host 406 or to store them to the storage medium 414. However, one could apply the same "zero copy" and "scatter/gather" techniques used in such well-known software as Berkeley Sockets and readv/writev to move pointers between the tasks rather than having to copy the data 416.

As indicated previously, the storage medium 114 may include non-volatile storage. For example, the storage medium 114 may include a flash file system. Flash file systems are well known. They store data with "wear-leveling" making sure that flash memory erase cycles are evenly distributed to prevent one part of the flash from "wearing out." (Flash memory has a limited number of erase cycles.)

Figure 8:
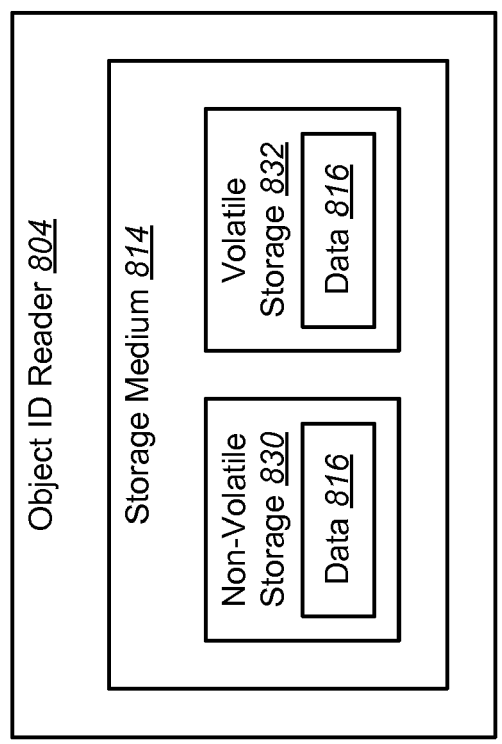
FIG. 8 is a block diagram illustrating an embodiment of the storage medium of the object ID reader.

Other implementations of the storage medium 814 are possible. For example, the storage medium 814 of the object ID reader 804 may include both non-volatile storage 830 and volatile storage 832, as shown in FIG. 8. In some embodiments, data 816 may initially be stored in the volatile storage 832. The data 816 in the volatile storage 832 may be committed to the non-volatile storage 830 before the reader 804 goes into power-down mode. The data 816 may also be committed to the non-volatile storage 830 periodically, independent of power-down. In some embodiments, data 816 upload may be first from the non-volatile storage 830 and then from the volatile storage 832 so as to preserve the original data sequence.

In some applications, it is desirable to both send the data 916 to the host 106 and store a copy of the data 934 at the reader 904 as a log. The object ID reader 904 may be configured so that buffered data 916 (i.e., data 916 that are automatically uploaded to the host) are distinguished from the log 934. To take advantage of the auto-buffer-and-send-when-able feature and also provide the full log 934, data 916 that are stored temporarily for later auto-upload may be differentiated from data 934 that are stored as a log.

Figure 9:
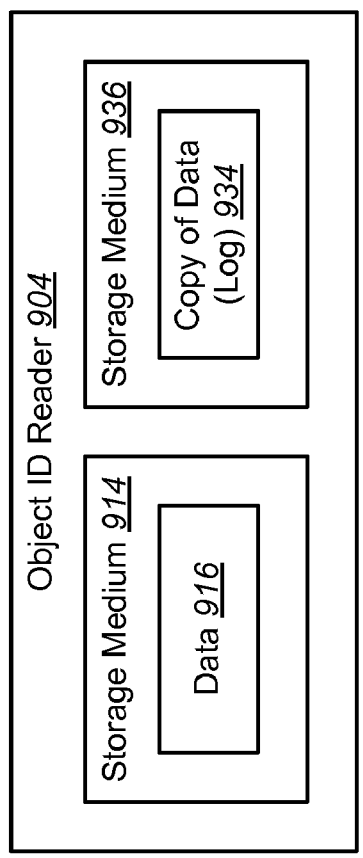
FIG. 9 is a block diagram illustrating one way in which buffered data may be differentiated from log data.

This feature may be implemented by providing two storage mediums, a first storage medium 914 and a second storage medium 936. This is illustrated in FIG. 9. The first storage medium 914 is used to store buffered data 916, as described previously. The second storage medium 934 is used to store a copy of all data 934 and may be uploaded on request (as opposed to being automatically uploaded).

Figure 10:
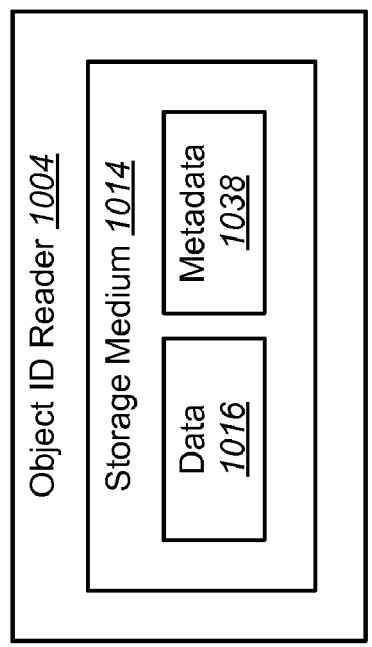
FIG. 10 is a block diagram illustrating another way in which buffered data may be differentiated from log data.

Alternatively, this feature may be implemented by storing only one copy of the data 1016 in the storage medium 1014 and adding metadata 1038 to differentiate buffered data (i.e., data that will be automatically uploaded) from log data. This is illustrated in FIG. 10. In some embodiments, the metadata 1038 may take the form of a bit for "need to send." This bit may be set for buffered data and cleared once it has been sent.

In embodiments where data 1016 are to be automatically sent to the host 106 and no log is to be created, data 1016 may be stored as "need to send." The data 1016 may be automatically uploaded. When sent, the data 1016 may be erased from the storage medium 1014.

In embodiments where data 1016 are only to be stored as a log and not automatically sent to the host 106, data 1016 may be stored with the "need to send" bit cleared. The data 1016 may then be uploaded only upon command. Also, the data 1016 may be erased from the storage medium 1014 only upon command (e.g., a "clear log" command).

In embodiments where data 1016 are to be automatically sent to the host 106 and in addition the data 1016 are to be stored as a log, data 1016 that couldn't yet be sent are stored as "need to send." Data 1016 that were successfully sent are stored with "need to send" cleared. Only data 1016 stored as "need to send" are automatically uploaded. When successfully sent, the "need to send" bit is cleared (but the data 1016 are not erased from the storage medium 1014). Upon command (e.g., "upload log" command), all data 1016 may be uploaded to the host 106. Also, upon command (e.g., "clear log" command), all data 1016 may be erased from the storage medium 1014.

Some embodiments may include an enhancement to support sharing of multiple object ID readers 104 with a single host 106. Under some circumstances, it is desirable for several object ID readers 104 to connect concurrently with a single host 106. This ordinarily works with some Bluetooth adapters (which support multiple virtual serial ports) and with adapters that are configured for communication in accordance with IEEE 802.11.

One difficulty that may be encountered is that many Bluetooth adapters enable only a single point-to-point serial port profile connection (i.e., a single reader can be connected at any one time to a virtual serial port via Bluetooth). To overcome this difficulty, in embodiments where it is desirable for multiple readers 104 to share with a single-port Bluetooth host 106, the readers 104 may be configured to operate in an "auto-connect/auto-upload and auto-disconnect" mode. In this mode, the reader 104 disconnects from the host 106 if the reader 104 is connected to the host 106 and the reader 104 does not have any data 116 to send to the host 106.

Figure 11:
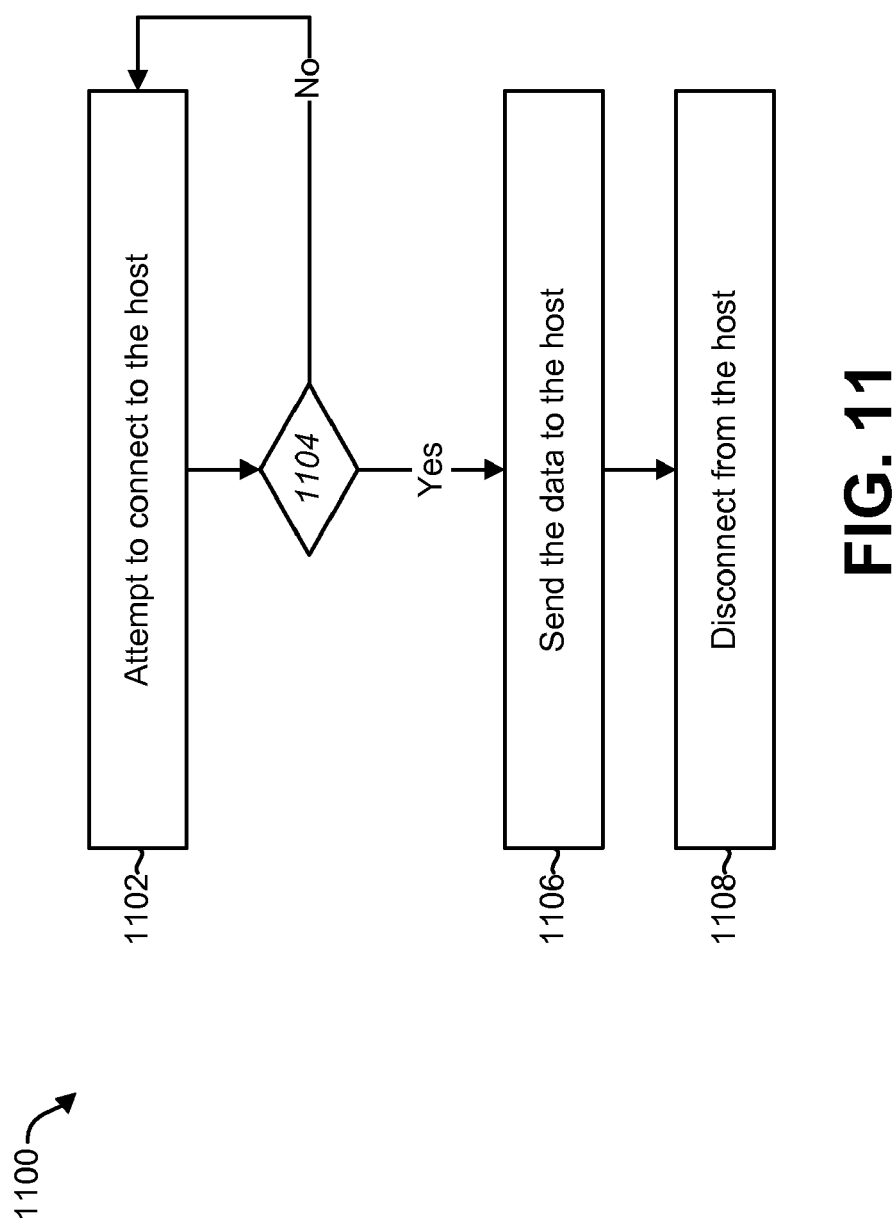
FIG. 11 is a flow diagram illustrating an embodiment of a method which may be performed by an object ID reader to enable multiple readers to share with a single-port Bluetooth host.

As shown in the method 1100 illustrated in FIG. 11, when the object ID reader 104 has data 116 to send, it attempts to connect 1102 to the host 106. If it is determined 1104 that the attempt is unsuccessful, the reader 104 keeps trying until a connection to the host 106 is established. When a connection is established, the reader 104 sends 1106 the data 116 to the host 106 and then disconnects 1108.

Suppose that two readers 104 read object IDs 102 at the same instant. Both attempt to establish a connection to the host 106. One succeeds, and the other fails. The reader 104 that succeeds uploads its data 116. Meanwhile, the reader 104 that did not succeed keeps retrying. After the one that succeeded finishes uploading its data 116, it disconnects, making the connection available. The other reader 104, still retrying, succeeds in establishing a connection, uploads its data 116, and then disconnects. This solution enables sharing of a single virtual port between multiple readers 104. There is a delay while a reader 104 connects (with retries) and then sends, but because the reader 104 can read object IDs 102 and send data 116 in parallel, the user doesn't need to care about the delay. Even when a host 106 supports multiple virtual ports, it can be preferable to share multiple readers 104 on a single port because existing host software applications often support a single port (and have no provision for reading from multiple ports).

Figure 12:
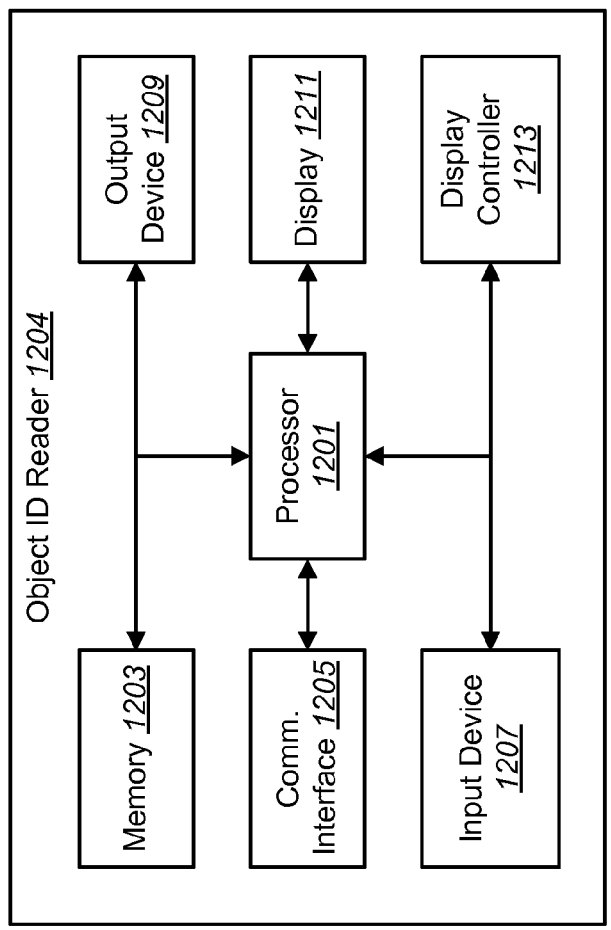
FIG. 12 is a block diagram illustrating the major hardware components typically utilized in an object ID reader.

FIG. 12 is a block diagram illustrating the major hardware components typically utilized in an object ID reader 1204. The illustrated components may be located within the same physical structure or in separate housings or structures.

The object ID reader 1204 includes a processor 1201 and memory 1203. The processor 1201 controls the operation of the object ID reader 1204 and may be embodied as a microprocessor, a microcontroller, a digital signal processor (DSP) or other device known in the art. The processor 1201 typically performs logical and arithmetic operations based on program instructions stored within the memory 1203.

As used herein, the term "memory" 1203 is broadly defined as any electronic component capable of storing electronic information, and may be embodied as read only memory (ROM), random access memory (RAM), magnetic disk storage media, optical storage media, flash memory devices in RAM, on-board memory included with the processor 1201, EPROM memory, EEPROM memory, registers, etc. The memory 1203 typically stores program instructions and other types of data. The program instructions may be executed by the processor 1201 to implement some or all of the methods disclosed herein.

The object ID reader 1204 typically also includes one or more communication interfaces 1205 for communicating with other electronic devices. The communication interface 1205 may be based on wireless communication technology, wired communication technology, or both. Examples of different types of communication interfaces 1205 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The object ID reader 1204 typically also includes one or more input devices 1207 and one or more output devices 1209. Examples of different kinds of input devices 1207 include a keyboard, mouse, microphone, remote control device, button, joystick, trackball, touchpad, lightpen, etc.

Examples of different kinds of output devices 1209 include a speaker, printer, etc. One specific type of output device which is typically included in a computer system is a display device 1211. Display devices 1211 used with embodiments disclosed herein may utilize any suitable image projection technology, such as a cathode ray tube (CRT), liquid crystal display (LCD), light-emitting diode (LED), gas plasma, electroluminescence, or the like. A display controller 1213 may also be provided, for converting data stored in the memory 1203 into text, graphics, and/or moving images (as appropriate) shown on the display device 1211.

Of course, FIG. 12 illustrates only one possible configuration of an object ID reader 1204. Those skilled in the art will recognize that various other architectures and components may be utilized. In addition, various standard components are not illustrated in order to avoid obscuring aspects of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An object identifier reader, comprising:
   a processor;
   a storage medium;
   an image buffer;
   a main task; and
   a data task;
   wherein the main task is executed by the processor to:
      read an object identifier to obtain data, the data comprising an image of the object identifier;
      store the data in the image buffer;
      signal the data task that the image of the object identifier is stored in the image buffer; and
      wait for the data task to signal that the image buffer is no longer needed; and
   wherein the data task is executed by the processor to:
      receive a signal from the main task indicating that the image of the object identifier is available;
      determine if the object identifier reader is connected to the host computing device;
      attempt to connect the object identifier reader to the host computing device if the object identifier reader is not connected to the host computing device;
      attempt to send the image of the object identifier to the host computing device if the object identifier reader is connected to the host computing device;
      store the image of the object identifier in the storage medium if the attempt to connect the object identifier reader to the host computing device is unsuccessful or if the attempt to send the image of the object identifier to the host computing device is unsuccessful; and
      signal the main task that the image buffer is no longer needed.

2. The object identifier reader of claim 1, wherein:
   the object identifier reader further comprises a data task buffer;
   the main task is executed by the processor to:
      read an additional object identifier to obtain non-image data;
      place the non-image data in the data task buffer; and
      signal the data task that the non-image data is in the data task buffer; and
   the data task is executed by the processor to:
      receive a signal from the main task indicating that the non-image data is in the data task buffer;

attempt to send the non-image data in the data task buffer to the host computing device if the object identifier reader is connected to the host computing device; and store the non-image data in the storage medium if the attempt to connect the object identifier reader to the host computing device is unsuccessful or if the attempt to send the non-image data to the host computing device is unsuccessful.

3. The object identifier reader of claim 1, wherein the object identifier reader is configured to clear the data from the storage medium when the stored data is sent to the host computing device.

4. The object identifier reader of claim 1, wherein the storage medium comprises non-volatile storage.

5. The object identifier reader of claim 4, wherein the storage medium further comprises volatile storage.

6. The object identifier reader of claim 1, further comprising an additional storage medium for storing a copy of the data as a log.

7. The object identifier reader of claim 1, wherein the object identifier reader is configured to save metadata in the storage medium to differentiate buffered data from log data.

8. The object identifier reader of claim 1, wherein the object identifier reader is configured to disconnect from the host computing device if the object identifier reader is connected to the host computing device and the object identifier reader does not have any data to send to the host computing device.

9. The object identifier reader of claim 1, wherein the object identifier reader is configured to enter a power-saving mode if the storage medium is empty or if the object identifier reader cannot connect to the host computing device after a period of time.

* * * * *